(12) United States Patent
Oberhoffner et al.

(10) Patent No.: US 8,188,731 B2
(45) Date of Patent: May 29, 2012

(54) CONTROL SYSTEM INCLUDING A CONTROL CIRCUIT AND SENSOR, AND METHOD FOR OPERATION OF THE CONTROL SYSTEM

(75) Inventors: Gerhard Oberhoffner, Graz (AT); Colin Steele, Soding (AT); Kurt Riedmuller, Unterpremstatten (AT)

(73) Assignee: Austriamicrosystems AG, Unterpremstätten (AT)

( * ) Notice: Subject to any disclaimer, the term of this patent is extended or adjusted under 35 U.S.C. 154(b) by 552 days.

(21) Appl. No.: 10/528,956

(22) PCT Filed: Aug. 14, 2003

(86) PCT No.: PCT/EP03/09042
§ 371 (c)(1),
(2), (4) Date: May 5, 2005

(87) PCT Pub. No.: WO2004/034161
PCT Pub. Date: Apr. 22, 2004

(65) Prior Publication Data
US 2006/0164078 A1    Jul. 27, 2006

(30) Foreign Application Priority Data
Sep. 25, 2002   (DE) .................................. 102 44 905

(51) Int. Cl.
*G01N 27/82*   (2006.01)
(52) U.S. Cl. ............ 324/219; 700/45; 375/375; 360/67; 365/45
(58) Field of Classification Search .................... 700/45; 324/219; 375/375; 360/67; 365/45
See application file for complete search history.

(56) References Cited

U.S. PATENT DOCUMENTS

| | | | |
|---|---|---|---|
| 4,337,516 A | 6/1982 | Murphy et al. | |
| 4,879,610 A * | 11/1989 | Jove et al. | 360/67 |
| 5,339,275 A * | 8/1994 | Hyatt | 365/45 |
| 5,777,870 A | 7/1998 | Takau et al. | |
| 5,818,656 A * | 10/1998 | Klaassen et al. | 360/67 |

(Continued)

FOREIGN PATENT DOCUMENTS

DE    25 41 062    3/1977

(Continued)

OTHER PUBLICATIONS

English Translation of International Preliminary Examination Report for application PCT/EP2003/09042.

(Continued)

*Primary Examiner* — Kakali Chaki
*Assistant Examiner* — Tejal Gami
(74) *Attorney, Agent, or Firm* — Fish & Richardson P.C.

(57) ABSTRACT

A controller includes a control circuit. The control circuit includes a forward path that includes an input and an output, a feedback path coupled to the output and to the input, and a sensor that is between the input and the output. The sensor generates a sensor signal based on an input signal applied to the input. The forward path generates an output signal based on the sensor signal. The output signal is sent along the feedback path to the input of the forward path. The controller also includes a detector that obtains an intermediate signal from the forward path between the input and the output. The detector generates a control signal using the intermediate signal. The forward path includes a control device that limits the output signal to a predetermined value. The detector controls the control device using the control signal.

20 Claims, 1 Drawing Sheet

U.S. PATENT DOCUMENTS

| | | |
|---|---|---|
| 6,512,960 B1 | 1/2003 | Schulz |
| 6,515,882 B2 | 2/2003 | Moriguchi et al. |
| 2001/0050552 A1 | 12/2001 | Sandquist et al. |
| 2002/0001209 A1 | 1/2002 | Moriguchi et al. |

FOREIGN PATENT DOCUMENTS

| | | |
|---|---|---|
| DE | 31 24 082 | 8/1993 |
| DE | 42 30 939 | 4/1995 |
| DE | 195 39 519 | 5/1996 |
| DE | 694 12 649 | 4/1999 |
| DE | 199 21 828 | 11/2000 |
| DE | 101 20 273 | 11/2001 |
| EP | 1 225 453 | 7/2002 |
| WO | WO96/16339 | 5/1996 |

OTHER PUBLICATIONS

Allowed claims from corresponding European Application No. 03807792.1-1239 (3 pages).

International Search Report in Application No. PCT/EP03/09042, dated Dec. 2, 2003.

* cited by examiner

CONTROL SYSTEM INCLUDING A CONTROL CIRCUIT AND SENSOR, AND METHOD FOR OPERATION OF THE CONTROL SYSTEM

TECHNICAL FIELD

The invention relates to a controller with a control circuit that contains a feedback path coupled back to the feedback input of the control circuit, and with a sensor that is arranged in the control circuit and emits a sensor signal at its output, which is converted into a feedback signal and routed back to the feedback input of the control circuit.

The invention further relates to a method for operating the controller.

BACKGROUND

Such control circuits are known. An input signal of the control circuit is usually routed to a summing point, whose output leads into the control path that emits the output signal of the control circuit. The output signal is measured and coupled back with a negative sign to the feedback input of the summing point, i.e., the input of the control circuit. This makes it possible to control the output signal of the control circuit as a function of its input signal in compliance with the requirements and control characteristics pertaining to the control circuit.

The output signal of the control circuit is measured by means of a sensor selected based on the variable to be physically acquired. This sensor can be arranged either in the control path itself or in the feedback path. The control circuit is closed via the feedback signal, which forms in the feedback path, and is superimposed with a negative sign on the input signal.

Sensors for physical variables, e.g., magnetic or electric fields, or for mechanical or chemical variables, exhibit a sensor-typical characteristic for the output signal as a function of the input variable to be measured. These characteristics are often linear only in a small region, the operating range of the sensor, and exhibit a nonlinear characteristic outside this region between the input variable to be measured and the output signal of the sensor. This results in nonlinearities that must be specially considered in a control circuit, and are often difficult to correct.

In certain instances, the characteristic of a sensor proceeds in a nonlinear manner, wherein the sensitivity, i.e., the output signal of the sensor, no longer increases as the measuring variable rises, but the sensitivity tapers off again after a maximum has been exceeded as the measuring variable continues to rise. Sensitivity follows the opposite pattern by increasing again after falling below a minimum as the measuring variable drops. This behavior is observed, for example, in the HNC 1001/1002 magnetoresistive sensor made by Honeywell. At a magnetic field of 0 Oe, this sensor exhibits virtually no output voltage. In a range of up to 5 Oe, there is a linear dependence between the magnetic field and output voltage. Sensitivity tapers off as the magnetic field continues to rise, i.e., the output voltage of the sensor no longer rises to the same extent. At roughly 11 Oe, the sensitivity curve peaks. At higher magnetic flux densities, the output voltage of the sensor tapers off toward 0. Negative flux densities of the magnetic field produce a mirror image curve.

In a general controller, in particular in devices with magnetoresistive sensors, the nonlinearities caused by the sensitivity curve of the sensor negatively impact the properties of the closed control circuit. In overload situations involving a sharp rise in the input variable, the signal output of the sensor might not emit a higher signal, but instead a lower signal not corresponding to the input signal to be measured. This means that the negative feedback loop might not be able to correct the control circuit any longer in these extreme operating situations. Such an effect is referred to as foldback, and is undesired in all applications.

SUMMARY

The object of the invention is to indicate a device and method of the kind mentioned at the outset in which nonlinear changes in the sensitivity of a sensor are detected, and reliable operating characteristics are enabled.

This object is achieved according to the invention by the features in claim 1 and claim 8.

The subclaims describe embodiments of the invention.

The invention provides that a change, in particular a deterioration, in the sensitivity of the sensor be detected and/or measured. As soon as such a change in sensitivity is detected or a prescribed level is exceeded, the output of the sensor is set to a predetermined value, preferably corresponding to the maximum measuring value. This predetermined value is preferably clamped, i.e., retained.

The foldback effect can be avoided in this way. In addition, irregular operating modes of the control circuit can be displayed or made apparent.

As soon as the sensor returns to an operating mode lying within the allowable sensitivity range, the clamp imposed on the predetermined value can be advantageously lifted, and the sensor can perform regularly once again.

The controller according to the invention provides an error signal generator that generates an error signal and feeds it into the control circuit, wherein the error signal is superposed on the useful signal of the control circuit. This useful signal can be the applied signal of the control path before the feeder node for the error signal. Also provided is a detector, which monitors the control circuit and establishes a gauge for the change in sensitivity or deterioration in sensitivity of the sensor. The output side of the detector feeds a control device of the control circuit, which sets or clamps the output signal of the control circuit to the predetermined value as a function of the output signal of the detector.

A device according to the invention makes it possible to utilize the amplification of the closed control circuit taking into account the sensor arranged in the control circuit, without having to open the control circuit, e.g., to measure the sensor sensitivity.

In a regular operating mode, the control circuit corrects the superposed error signal. The magnitude of the error signal and the location of the feeder or summing point at which the error signal is fed into the control circuit is here selected based on the design rules of the control circuit in such a way that the closed feedback circuit minimizes the error signal at the output of the controller to a negligible signal value relative to the useful output signal of the control circuit.

Given a deterioration in sensor sensitivity, the circuit amplification of the control circuit changes, and the error cannot be corrected any longer in the usual manner. This change can be detected by comparing the signals of the control circuit at the feeder node for the error signal before and after feeding in the error signal.

If the control circuit functions regularly in a linear region, the output of the feeder node for the error signal will not correspond to the input of this feeder node, and given a deteriorated loop amplification, the output of the feeder node for the error signal will correspond to the input of the feeder node. The comparison would be correspondingly opposite were the signal comparison to take place at the input of the feeder node for the error signal, and not its output.

In order to be able to compare the respective signals before and after the superposed error signal, the corresponding signal is measured and stored before feeding in and measuring the error signal. To this end, the detector preferably has a memory and comparator, which compares a signal of the control path with a signal stored in the memory.

The comparator is preferably connected with a decision circuit, which generates the output signal of the detector connected with the control device.

In an advantageous embodiment, the control device has a clamp circuit, which clamps the output signal of the control path to the predetermined value.

In another advantageous embodiment, the detector contains a signal level comparator and/or a signal sign comparator, whose input is connected with the control circuit, and whose output is connected with the decision circuit.

The output of the decision circuit is connected with the control device on the one hand, and with the error signal generator on the other, whose other input is connected with a time signal generator. Depending on the signals of the decision circuit, this is why the control device is clamped to the predetermined value on the one hand, and the error signal generator is activated or deactivated on the other.

The signal sign comparator is provided in particular in bipolar sensor systems, i.e., in sensor systems that measure positive or negative signed measuring variables. A sign is found in this manner, so that the error signal can be fed into the control circuit with the corresponding polarity. In general, it must here be stated that the error signal, typically a rectangular signal, is injected with a polarity opposite the polarity of the output signal of the control circuit.

The signal level comparator is advantageous in particular in cases where the sensor system has sufficiently high loop amplification with the control circuit exposed to overload conditions to clamp the output signal of the control circuit to the predetermined value. In this case, the output of the detector can be deactivated as an option. The signal level comparator monitors the signal amplitude of the control circuit to determine whether the loop amplification is sufficiently high based on the design criteria of the control circuit.

In a particularly advantageous embodiment of the invention, the sensor is a magnetoresistive sensor suitable for acquiring a magnetic field. This type of sensor makes it possible to configure the control circuit as a current measuring system.

The invention will be described in greater detail below based on exemplary embodiments shown on the figures in the drawing. Shown on:

DESCRIPTION OF THE DRAWINGS

FIG. 2b is a wiring diagram of the controller according to FIG. 2a.

DETAILED DESCRIPTION

Figure 2A:
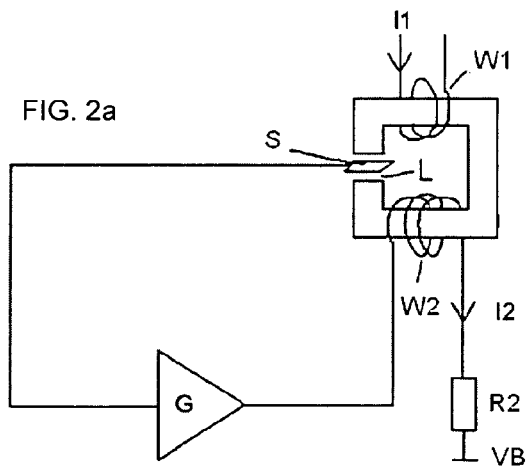
FIG. 2a is a controller with a magnetoresistive sensor for current measurement.

FIG. 2a shows a controller with a current measuring sensor consisting of three main components. The first component is a current transformer containing a core K with an air gap L. Accommodated on the core is a primary winding W1, which carries a current I1. In addition, the core K accommodates a second winding W2, through which the current I2 flows on the secondary side. The second component of the controller is the magnetic sensor S, which in this case is designed as a magnetoresistive sensor, and is situated in the air gap L of the core. The third component of the controller is a negative feedback path, which connects the sensor S with the secondary winding W2 of the transformer by way of an amplifier G. The output side of the secondary winding W2 is connected by a resistor R2 with a reference potential VB, e.g., ground.

The input current I1 flowing in the primary winding W1 of the current transformer generates a magnetic flux in the air gap L. This magnetic flux is acquired by the sensor S, and calibrated to zero by negatively coupling back the control circuit. The control circuit here sets the current I2 passing through the secondary winding W2 in such a way that the magnetic flux generated by the current I2 is directionally opposite and quantitatively identical to the magnetic flux generated by the current I1 in the air gap. The current I2 passing through the secondary winding is the gauge for the magnitude of current I1 in the primary winding.

The sensor S, a magnetoresistive sensor in the exemplary embodiment, exhibits the parasitic property of decreasing sensitivity that becomes zero if the magnetic flux density in the air gap L exceeds a sensor-specific maximum field. The maximum value of the magnetic field strength is a property of the sensor that varies specific to the sensor. The described parasitic property of the sensor detracts from the properties of the closed control circuit of the control sensor controller.

Under overload operating conditions, in which a high current I1 flows in the primary winding, the current I2 in the secondary winding cannot be further increased, since the output of the current sensor S has already reached its maximum value. It is even possible that the initial value of the current sensor will drop again given a rising magnetic field strength. This means that the magnetic flux in the air gap L can no longer be compensated through negative back coupling with the help of the secondary current I2, so that a value for the magnetic flux in the air gap L is not equal to zero. For this reason, the magnetic flux in the air gap of the current transformer will rapidly increase as the primary current I1 continues to rise, since the current I2 can no longer compensate. As a result, the magnetic flux in the air gap will rise to a value exceeding the maximum value of the sensor allowable for measurement. The sensor either has lost or will lose its sensitivity. In a magnetoresistive sensor of the kind described in the data sheet publication of Honeywell alluded to at the outset, magnetic fluxes can be accompanied by a foldback effect, in which the output signal of the sensor becomes even smaller than at lower magnetic field strengths. Such a foldback effect puts the controller in an uncontrollable state, which is undesired for any application.

Figure 1:
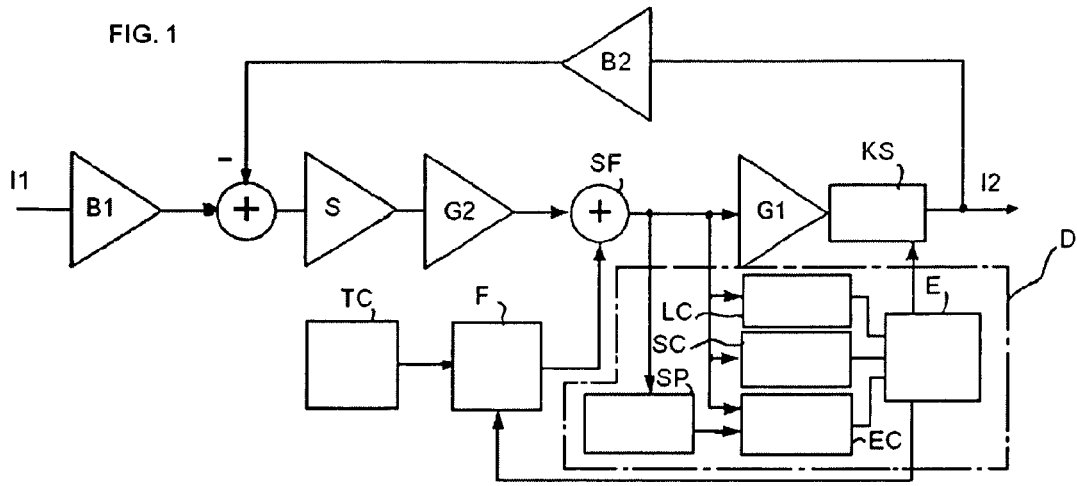
FIG. 1 is a wiring diagram of the controller according to the invention.
Figure 2B:
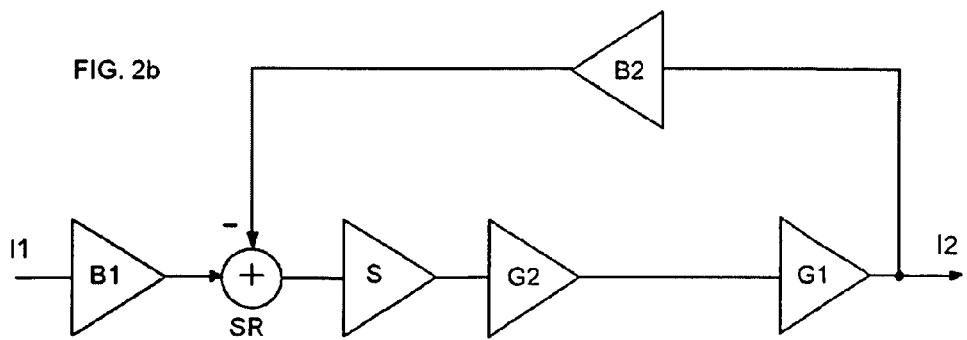

FIG. 2b shows an equivalent circuit diagram of the controller according to FIG. 2a. As a variable to be measured, the current I1 generates the magnetic flux B1, which is passed to a summing unit Sr as the input signal of the control circuit R. A magnetic flux is acquired by the sensor S at the output side as an output signal of the summing unit SR, and converted into the secondary current I2 of the control circuit by means of an amplifier with the two elements G1 and G2. In turn, the transformer helps the secondary current I2 to generate the magnetic flux B2, which is relayed back with a negative sign to the second input of the summing unit SR. The element G shown as an amplifier on FIG. 2a is realized by two elements G1 and G2 on FIG. 2b in order to make the invention easier to understand based on FIG. 1.

FIG. 1 shows a controller according to the invention based on the exemplary embodiment of the current measuring controller, a basic description of which has already been given based on FIG. 2. The same elements as on FIG. 2b are marked with the same reference numbers on FIG. 1. As opposed to FIG. 2b, a summing unit SF connected at one input with the output of the amplifier G2 is arranged between the two amplifier elements G1 and G2 on FIG. 1. The other input is connected with an error signal generator F, which generates an error signal and feeds it into the summing unit SF. The error signal of the error signal generator F is generated when the output of the error signal generator F is released by a decision circuit E and/or a time signal generator TC. The error signal can be rectangular. The output of the summing unit SF is routed to the amplifier G1 on the one hand, and to a detector D on the other. The output side of the detector D is coupled back to the error signal generator F on the one hand, and to a control device KS on the other, which is designed as a clamp circuit, and connected in the output circuit of the amplifier G1. The output of KS determines the current I2 of the secondary winding of the transformer.

Under normal operating conditions with the control circuit not exposed to overload, the control device KS is bridged over, so that the output current I2 is formed by the output current of the amplifier G1.

During overload operation, the control device KS is actuated by the detector D in such a way that the output current I2 is set and clamped to a predetermined value typically corresponding to the maximum output current value of the controller. This value exceeds the maximum output current allowed under normal operating conditions. In conjunction with a recorder or display, it is therefore possible to ascertain a regular operating mode of the current measuring device, because the output current I2 is clamped to a current higher than allowed during measuring operation.

The operating mode of the controller, i.e., the sensitivity of the magnetoresistive sensor S, is measured with the device according to FIG. 1 by routing an error signal of the error signal generator F to the summing unit SF, and having the error signal overlap the measuring signal. The error signal is considerably smaller by comparison to the measuring signal of the control circuit.

The injection point of the error signal can also be provided at another location in the control circuit. It is important that the error signal be injected into the closed control circuit, so that is also corrected in the controller. This makes it possible to utilize the full loop amplification of the control circuit, and incorporate the error signal in the characteristic behavior of the sensor S in order to correct the superposed error signal using the secondary current I2 in the magnetic field.

The magnitude of the error signal generated by the error signal generator F is selected in such a way that the closed control circuit minimizes the error signal to an undetectable signal level at the output of the current sensor.

Given a reduction in sensitivity of the sensor S, the loop amplification of the control circuit decreases, and the error signal cannot be fully compensated any longer. As opposed to the regular state in which the error signal can be fully compensated, this state involving a reduced sensor sensitivity can be detected by comparing the respective signals at the summing point for the error signal SF before and after injecting the error signal. If the control circuit is operating under normal operating conditions, the output of the summing unit SF will not follow the error signal, because the control circuit compensates for the error signal. However, the error signal does become measurable at the output of the summing unit SF given reduced loop amplification. The situation is correspondingly opposite when the comparison is performed at the input of the summing unit SF or at the output of the amplifier G2.

In order to now be able to compare the respective signal at the output of the summing unit SF before and after superposing the error signal, at least one of the signals must be intermediately stored, thereby enabling a comparison with the respective other operating state. The output signal of SF is intermediately stored in the detector D by storage element SP, which occupies an input of the error comparator EC on the output side. The other input of the error comparator EC is connected with the output of the summing unit SF. The output side of the error comparator leads to a decision circuit E, which generates an output signal at a corresponding input signal in order to actuate the control device KS for clamping the output current I2.

In a controller incorporating a sensor system that allows both polarities, e.g., for oppositely oriented magnetic field strengths, the detector D contains a sign storage element SC, whose input is connected with the output of the summing unit SF, and whose output is connected with the decider logic E. The sign storage element SC stores the sign or polarity of the applied signal, so that the output of the decider logic coupled back to the error signal generator F can be set in an overload region in such a way that the polarity of the error signal injected at the node SF is set opposite to the sign of the output signal of the control circuit.

Preferably provided as an additional element for the detector D is a signal level comparator LC, whose input is also connected with the summing unit SF, and whose output is connected with the decider logic E. Under overload conditions in which the controller of the sensor system still has a sufficiently high loop amplification to set the output of the control circuit to its maximum value, the signal level generator LC ensures that part of the detector D can be optionally deactivated. In this case, the decider logic does not have to generate a signal that activates the clamp circuit KS.

As depicted based on FIG. 1, it is especially advantageous to intermittently inject the error signal of the error signal generator F into the node SF. This can be accomplished with a frequency in the kHz region, so that the measuring process of the detector D lies in a range of a few microseconds. The advantage to the invention is that this region can always be clearly discerned in an overload region, and that the closed control circuit need not be opened for this purpose.

If the current I1 passing through the primary winding of the transformer drops back down to a value that allows regular sensor operation or regular controller operation upon termination of the overload region, this fact is ascertained using the detector D, and the control device KS is again bridged over, or the clamp circuit deactivated.

It must be emphasized that the control arrangement according to the invention involves a universal device or universal method. The invention can be used in any controller in which a sensor with parasitic properties is incorporated into the control circuit. In a closed control circuit, the loop amplification of the system is used to check the sensitivity or accuracy of the sensor output. All parasitic errors of the control circuit, such as amplification changes, offset, noise or superposed error signals, are attenuated by the loop amplification with negative feedback. Given a deterioration in properties of an element in the closed control circuit, the superposed error signal is no longer compensated, and can therefore be used to detect the deterioration in properties of the controller, and set the output of the controller accordingly.

The invention claimed is:

1. A controller comprising:
a control circuit comprising a closed loop circuit, the closed loop circuit comprising:
an input;
an output;
a forward path coupled to the input and to the output;
a feedback path coupled to the input and to the output; and
a sensor having a sensitivity, the sensor being in the forward path or in the feedback path, the sensor for generating a sensor signal;
an error signal generator that is external to the closed loop circuit, the error signal generator to generate an error signal and to provide the error signal to the closed loop circuit such that the error signal is incorporated into a useful signal of the closed loop circuit, wherein the error signal has a preselected magnitude, the closed loop circuit being configured to generate an output signal at the output, the output signal being based on the sensor signal and the error signal, the output signal being sent along the feedback path to the input; and
a detector configured to detect a change in the sensitivity of the sensor, the detector being coupled to the forward path, the detector to generate a control signal;
wherein the forward path comprises a control device, which is coupled to the output, to limit an output signal at the output to a predetermined value, the detector to control the control device using the control signal.

2. The controller of claim 1, wherein the detector comprises:
a storage device to store a measurement signal; and
a comparator to compare an intermediate signal to the measurement signal and to output a comparator signal, the intermediate signal being stored in the storage device.

3. The controller of claim 2, wherein the detector further comprises:
decision logic to receive the comparator signal and to control the control device in accordance with the comparator signal.

4. The controller of claim 1, wherein the control device comprises a clamp circuit.

5. The controller of claim 2, wherein the comparator comprises at least one of a signal level comparator and a signal sign comparator.

6. The controller of claim 1, further comprising:
a time signal generator to generate a time signal output, wherein the error signal generator is configured to generate the error signal based on the time signal output.

7. The controller of claim 1, wherein the sensor comprises a magnetoresistive sensor.

8. A method of operating a controller comprised of:
a control circuit comprising a closed loop circuit, the closed loop circuit comprising:
an input;
an output;
a forward path coupled to the input and to the output;
a feedback path coupled to the input and to the output; and
a sensor having a sensitivity, the sensor being in the forward path or in the feedback path, the sensor generating a sensor signal, the forward path generating an output signal based on the sensor signal, the output signal being applied to the input coupled to the forward path via the feedback path;
wherein the method comprises:
generating an error signal that has a preselected magnitude, the error signal being generated outside the closed loop circuit;
incorporating the error signal into a useful signal of the closed loop circuit;
obtaining a measurement signal from the closed loop circuit, the measurement signal being obtained using a detector that is coupled to the closed loop circuit;
generating a control signal that is indicative of a change in sensitivity of the sensor, the control signal being based on comparison of the measurement signal and a stored signal; and
applying the control signal to a control device in the closed loop circuit, the control device being coupled to the output, and the control device limiting an output signal at the output to a predetermined value in response to the control signal.

9. The method of claim 8, wherein the measurement signal is stored in a storage device, and the comparison is performed using a comparator.

10. The method of claim 9, wherein the control signal is generated via decision logic, the decision logic being controlled by an output signal from the comparator, the decision logic generating the control signal if a predetermined criterion is satisfied.

11. The method of claim 9, wherein the comparator comprises at least one of a signal sign comparator and a signal level comparator.

12. The method of claim 10, wherein the error signal is generated based on an output of a time signal generator and an output of the decision logic; and
wherein the measurement signal is based on both the sensor signal and the error signal.

13. The method of claim 1, wherein the control signal comprise a signal output of the detector.

14. The controller of claim 1, wherein the sensor generates the sensor signal based on one or more input signals applied to the input of the forward path.

15. The method of claim 8, wherein the sensor generates the sensor signal based on one or more input signals applied to the input of the forward path.

16. A controller comprising:
a closed loop circuit comprising:
an input;
an output;
a forward path coupled to the input and to the output;
a feedback path coupled to the input and to the output; and
a sensor having a sensitivity, the sensor being in the forward path or in the feedback path, the sensor for generating a sensor signal, the sensor signal being converted into a feedback signal and being applied to the input via the feedback path;
an error signal generator to generate an error signal and to provide the error signal to the closed loop circuit such that the error signal is incorporated into a useful signal of the closed loop circuit, wherein the error signal has a preselected magnitude and wherein the error signal generator is external to the closed loop circuit;
a detector, which is coupled to the closed loop circuit, the detector being configured to detect a change in sensitivity of the sensor, the detector to generate a control signal based on the change in sensitivity of the sensor;

wherein the closed loop circuit further comprises a control device, the control device being coupled to the output to limit an output signal at the output to a predetermined value, the control device being controlled by the control signal.

17. The controller of claim 16, wherein the detector comprises:
   a storage device to store a measurement signal; and
   a comparator to compare a stored signal to the measurement signal and to output a comparator signal.

18. The controller of claim 17, wherein the detector further comprises:
   decision logic to receive the comparator signal and to control the control device in accordance with the comparator signal.

19. The controller of claim 16, wherein the control device comprises a clamp circuit.

20. The controller of claim 17, wherein the comparator comprises at least one of a signal level comparator and a signal sign comparator.

* * * * *

UNITED STATES PATENT AND TRADEMARK OFFICE
CERTIFICATE OF CORRECTION

| | |
|---|---|
| PATENT NO. | : 8,188,731 B2 |
| APPLICATION NO. | : 10/528956 |
| DATED | : May 29, 2012 |
| INVENTOR(S) | : Gerhard Oberhoffner, Colin Steele and Kurt Riedmuller |

It is certified that error appears in the above-identified patent and that said Letters Patent is hereby corrected as shown below:

IN THE CLAIMS:

Column 8, Claim 13, Line 36:

Delete "method" and Insert -- controller --

Signed and Sealed this
Fourth Day of September, 2012

David J. Kappos
*Director of the United States Patent and Trademark Office*